US010371539B2

(12) United States Patent
Broyles et al.

(10) Patent No.: US 10,371,539 B2
(45) Date of Patent: Aug. 6, 2019

(54) DETERMINING MATCHES USING DYNAMIC PROVIDER ELIGIBILITY MODEL

(71) Applicant: Lyft, Inc., San Francisco, CA (US)

(72) Inventors: Austin Broyles, San Francisco, CA (US); Robert Anthony Farmer, San Mateo, CA (US); Krishna Kumar Selvam, San Francisco, CA (US)

(73) Assignee: LYFT, INC., San Francisco, CA (US)

(*) Notice: Subject to any disclaimer, the term of this patent is extended or adjusted under 35 U.S.C. 154(b) by 249 days.

(21) Appl. No.: 15/454,906

(22) Filed: Mar. 9, 2017

(65) Prior Publication Data

US 2018/0259351 A1 Sep. 13, 2018

(51) Int. Cl.
| | | |
|---|---|---|
| *G01C 21/34* | (2006.01) | |
| *G06Q 30/06* | (2012.01) | |
| *G06Q 50/30* | (2012.01) | |
| *G06Q 10/06* | (2012.01) | |
| *H04W 4/00* | (2018.01) | |
| *G01C 21/36* | (2006.01) | |
| *H04W 4/029* | (2018.01) | |
| *H04W 4/02* | (2018.01) | |

(52) U.S. Cl.
CPC ....... *G01C 21/3438* (2013.01); *G01C 21/362* (2013.01); *G01C 21/3691* (2013.01); *H04W 4/02* (2013.01); *H04W 4/023* (2013.01); *H04W 4/029* (2018.02); *G06Q 2240/00* (2013.01)

(58) Field of Classification Search
None
See application file for complete search history.

(56) References Cited

U.S. PATENT DOCUMENTS

2018/0156623 A1* 6/2018 West ................. G01C 21/3423
2018/0191863 A1* 7/2018 Matthiesen ............. H04W 4/70

* cited by examiner

*Primary Examiner* — Thomas G Black
*Assistant Examiner* — Demetra R Smith-Stewart
(74) *Attorney, Agent, or Firm* — Keller Jolley Preece

(57) ABSTRACT

Embodiments provide techniques, including systems and methods, for determining matches of requestors and providers based on a dynamic provider eligibility model. For example, a request matching model uses an estimated arrival time for a requestor and estimated travel times for available providers to a pickup location to determine eligible providers for matching to a ride request. The matching model determines those providers that are far enough away from the request location to allow the requestor time to arrive at the pickup location without matching providers that are too far away, causing delay for the requestor and lowering the efficiency of the system by taking provider system resources from other service areas and increasing provider downtime upon matching. Additionally, embodiments provide more efficient matching processing leading to fewer canceled matched requests, fewer requests for a successful match, and fewer system resources necessary to meet requestor demand.

20 Claims, 10 Drawing Sheets

DETERMINING MATCHES USING DYNAMIC PROVIDER ELIGIBILITY MODEL

BACKGROUND

Traditionally, people have requested and received services at fixed locations from specific service providers. For example, various services were fulfilled by making a delivery to a user at a home or work location. Many services can now be accessed through mobile computing devices and fulfilled at arbitrary locations, often by service providers that are activated on demand. Such on-demand service offerings are convenient for users, who do not have to be at fixed locations to receive the services. Additionally, on-demand service matching systems may select and provide requests to service providers based on the location and status of service providers near a request location. Accordingly, on-demand matching systems may monitor system resources and control efficient resource allocation based on demand-matching between requestors and providers distributed through a geographic area. However, as such services have become more prevalent, and more users are interacting with such services, it can be difficult to identify and match available providers to requestors where both the providers and requestors are moving to non-fixed locations or are otherwise not immediately available for a match. For example, providers that are closest to a request location may arrive far before a requestor is ready for a service. This leads to inefficient resource allocation as the early matching of providers and requestors at a request location before a provider is prepared for a service leads to delay, canceled requests by providers, and duplicated requests by requestors.

BRIEF DESCRIPTION OF THE DRAWINGS

Various embodiments in accordance with the present disclosure will be described with reference to the drawings, in which.

DETAILED DESCRIPTION

Figure 1:
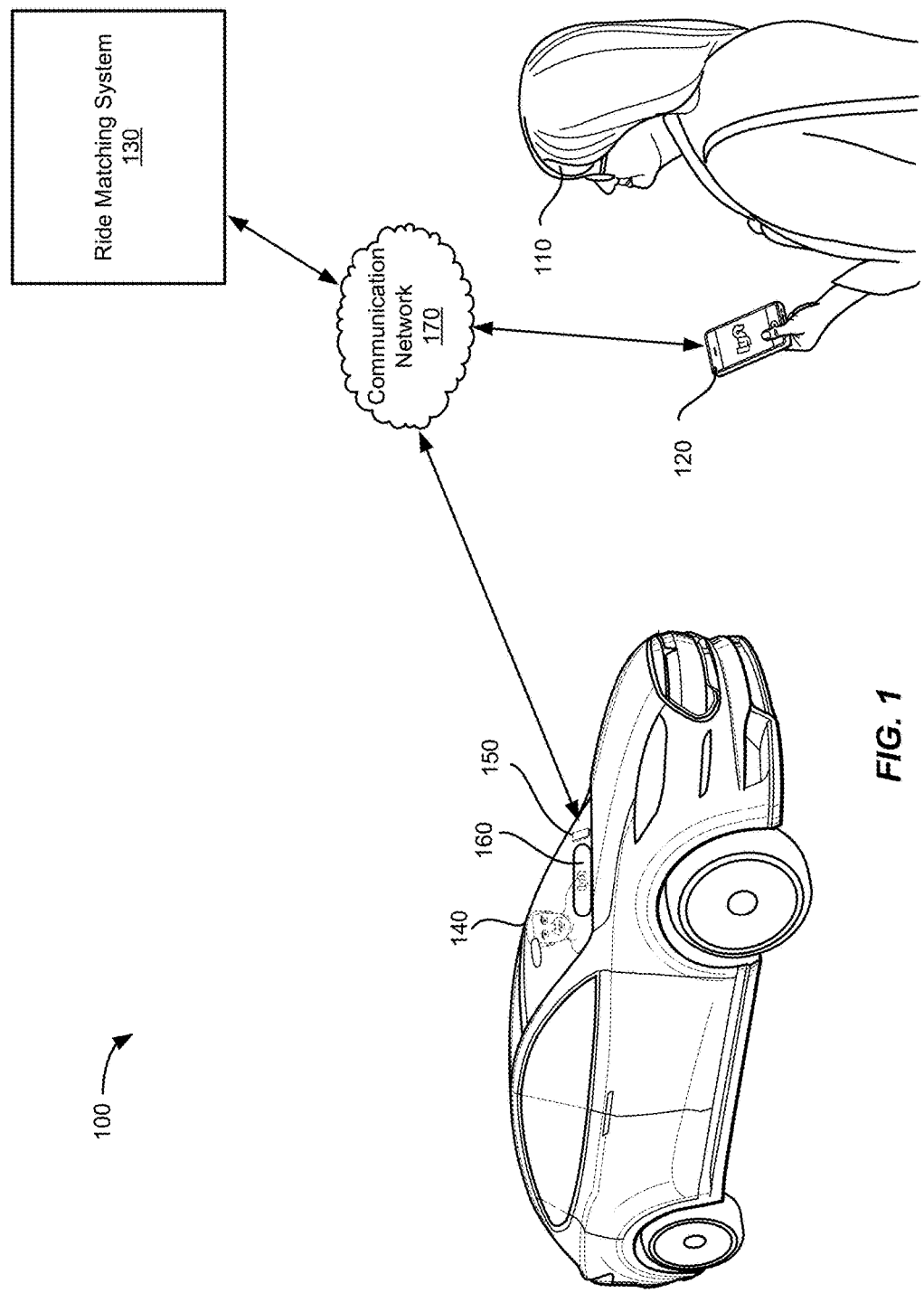
FIG. 1 illustrates an example of a ride matching system including a matched provider and requestor, in accordance with an embodiment of the present techniques.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On-demand services that are accessed through mobile devices are becoming more prevalent. However, due to the distributed and portable nature of providers and requestors being matched by an on-demand matching system, matching providers and requestors efficiently can be difficult due to delay of a requestor and the proximity of both the requestor and the providers to a request location. For example, a requestor may be in a high rise building and it may take 5 minutes to travel through heavy elevator traffic to get to the street level. The requestor may request a ride and be matched with a provider that is 1 minute away. As such, the provider may arrive far earlier than the requestor and may have to wait or circle the block multiple times until the requestor arrives at the request location. As another example, the requestor may be scheduling a ride at a different location than they are currently located at in order to avoid a busy area and/or because they have to pick something up in the area before getting the ride. As such, the requestor may request a pick up at a location that is 7 minutes away and/or may request a ride at that location at a given time (e.g., 10 minutes from now). If the provider is matched with the closest available provider, the provider may have to wait 7-9 minutes before the requestor arrives. Provider downtime is problematic because it reduces ride system resources in an area and leads to lower utilization of the provider. Accordingly, the difficulty in matching requests with providers using time-based estimates instead of geographic-based estimates leads to mismanagement of provider resources as well as increased data processing and system communications. For instance, providers may cancel a matched request where the requestor is not present at the pickup location so that they do not have so much downtime waiting on a requestor. Thus, requestors must place more requests in order to obtain a ride as one or more matched requests are canceled before the requestor is ready to be picked up. Accordingly, more requests may be generated and processed by a matching service, more accepted, rejected, and declined requests must be processed by the requestor and provider devices, and more system resources must be expended for a matched ride to be successfully completed.

For example, traditionally in ride matching environments that allow drivers and riders to be matched through a mobile application on their smart phones, it can be difficult to identify when a requestor is going to be ready for a ride. This can lead to providers canceling requests as it takes too long for the driver to wait for the rider to be available at the request location. As such, providers may cancel the ride request in order to wait for a new request that will not have downtime. However, the requestor may also request a new ride which can lead to increased system resources usage as more requests are required to fulfill the same rider demand.

Embodiments provide techniques, including systems and methods, for determining matches based on dynamic provider eligibility models. For example, a matching model uses an estimated arrival time for a requestor and estimated travel times for available providers to a pickup location to determine eligible providers for matching to a ride request. The matching model determines those providers that are far enough away from the request location to allow the requestor time to arrive at the pickup location without matching providers that are too far away, leading to delay for the requestor and lowering the efficiency of the system. For example, if providers are matched from too far away, matching will lead to slower pickups and will take away system resources from other areas, decreasing system efficiency. Accordingly, embodiments filter available providers to match to a request to those providers that will increase the efficiency of the system and optimize the matching system's request matching processing to minimize the number of requests that will require system resources to process.

Additionally, embodiments may use predicted provider availability to determine whether to match an eligible provider to a request or to delay the match to obtain a more efficient future match. Accordingly, embodiments provide efficient matching of requestors and providers by matching arrival times between providers and requestors as well as minimizing driving time of providers across the system. Further, by more efficiently matching requestors and providers using the specific location of the requestor computing device and limiting delays in providing services to requestors, embodiments limit the use of system resources for unnecessary canceled ride requests and the issuance of new ride requests as well as the lost downtime and increased throughput of providers. This results in more efficient processing of request by the matching system, leading to fewer system resources necessary to handle a ride request load and an amount of requestor demand in an area. Accordingly, request matching systems are improved through the more efficient matching processing and fewer resources are required to process the same amount of requestor demand.

FIG. 1 illustrates an example of a ride matching system 130 including a matched provider 140A and requestor 110A, in accordance with an embodiment of the present techniques. The ride matching system 130 may be configured to communicate with both the requestor computing device 120 and the provider computing device 150. The provider computing device 150 may be configured to communicate with a provider communication device 160 that is configured to easily and efficiently display information to a provider 140 and/or a requestor 110. The requestor 110 may use a ride matching requestor application on a requestor computing device 120 to request a ride at a specified pick-up location. The request may be sent over a communication network 170 to the ride matching system 130. The ride request may include transport request information that may include, for example, a request location, an identifier associated with the requestor and/or the requestor computing device, user information associated with the request, a location of the requestor computing device, a request time (e.g., a scheduled ride may have a future time for the request to be fulfilled or an "instant/current" time for transportation as soon as possible), and/or any other relevant information to matching transport requests with transport providers as described herein. The request location may include, for example, a current location, a future location, a "best fit/predictive" location, a curb segment, or any other suitable information for indicating a location for a requestor to be found at the current time or in the future. In some embodiments, the transport request may further include other request related information including, for example, requestor transport preferences (e.g., highway vs. side-streets, temperature, music preference (link to $3^{rd}$ party music provider profile, etc.), personalized pattern/color to display on provider communication device, etc.) and requestor transport restrictions (e.g., pet friendly, child seat, wheelchair accessible, etc.).

The requestor computing device may be used to request services (e.g., a ride or transportation, a delivery, etc.) that may be provided by the provider 140A. The provider computing device may be used to contact available providers and match a request with an available provider. However, it may be difficult for the ride matching system to identify which provider to match with the request because the requestor may not be immediately available and/or present at the request location. For example, a requestor may not be ready to leave yet and/or may not be present at the request location when they request the ride. Accordingly, if the request was matched with the closest available provider, the provider may arrive at the request location far too soon and may have to wait for the requestor to be ready. Thus, embodiments provide a solution that allows a ride matching system to efficiently match providers with a request using estimated travel times of both the requestor and the providers in the area to ensure the most efficient matching leading to the least amount of provider downtime and the most possible throughput by the ride matching system.

The ride matching system (also referred to as a "dynamic transportation matching system") 130 may identify available providers that are registered with the ride matching system 130 through an application on their provider communication device 150A. The ride matching system 130 may send the ride request to a provider communication device 150A and the provider 140A may accept the ride request through the provider communication device 150A. Additionally and/or alternatively, in some embodiments, the provider may be predictively and/or automatically matched with a request such that the provider may not explicitly accept the request. For instance, the provider may enter a mode where the provider agrees to accept all requests that are sent to the provider without the ability to decline and/or review requests before accepting. In either case, the provider computing device may return information indicative of a match indicating that the provider received the transport request. For example, the information indicative of a match may include a provider accept indicator (e.g., a flag) that indicates the provider received and accepts the indicator or could include a variety of different information. For example, the information indicative of a match may include location information, other route information for other passengers in the vehicle, a schedule for the provider providing information regarding future availability (e.g., when they are going to go offline), diagnostics associated with the car (e.g., gas level, battery level, engine status, etc.), and/or any other suitable information. The provider 140A and the requestor 110A may be matched and both parties may receive match information associated with the other respective party including requestor information (e.g., name, representative symbol or graphic, social media profile, etc.), provider information (e.g., name, representative symbol or graphic, etc.), request location, destination location, respective computing device location, rating, past ride history, any of the other transport request information and/or provider acceptance information identified above, and/or any other relevant information for facilitating the match and/or service being provided. Thus, the ride matching system 130 may dynamically match requestors and providers that are distributed throughout a geographic area.

Figure 2:
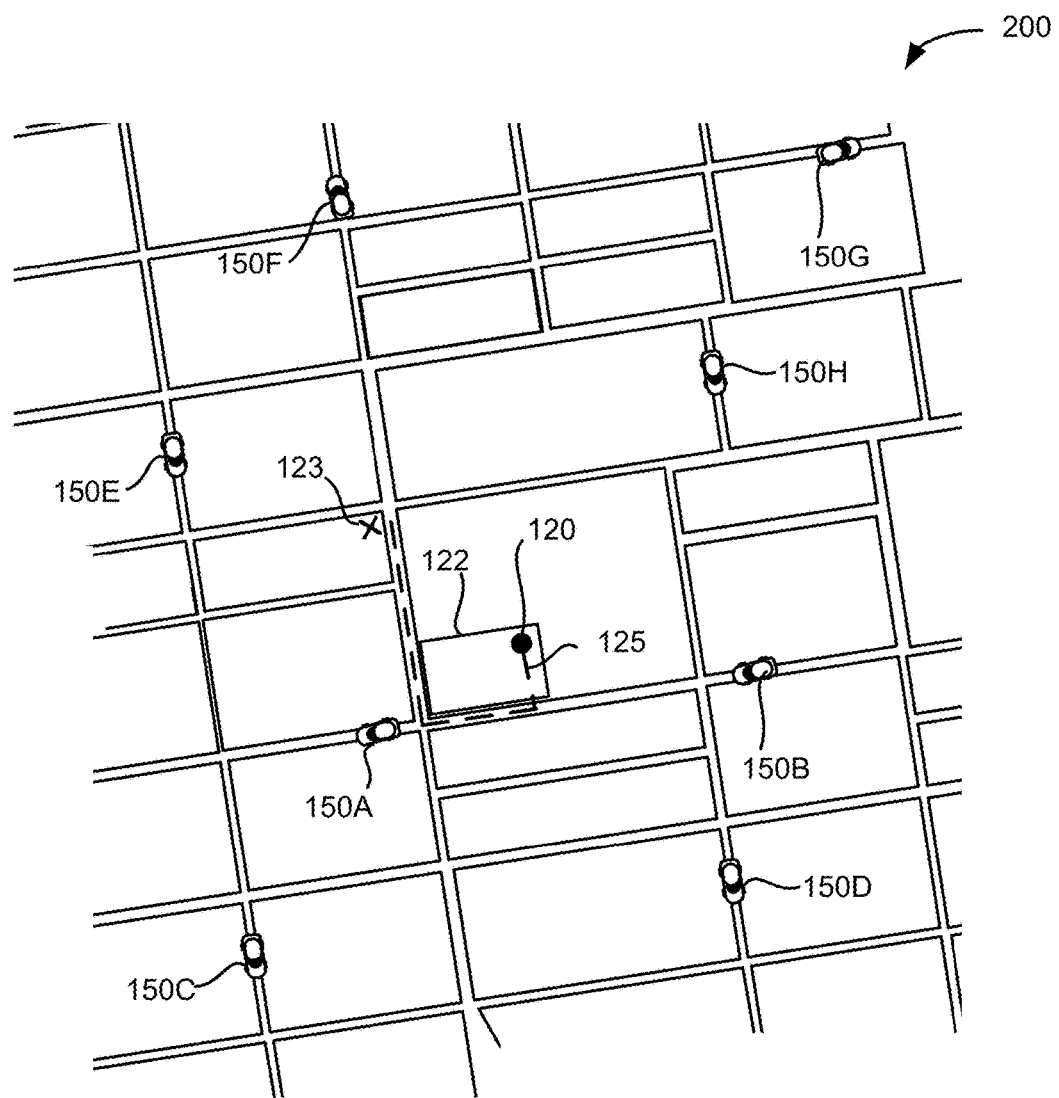
FIG. 2 illustrates an example of a ride matching system environment where a request associated with a request location may be matched with one of a variety of available providers, in accordance with an embodiment of the present techniques.

FIG. 2 illustrates an example of a ride matching system environment 200 where a requestor computing device 120 associated with a request location 123 may be matched with one of a variety of available providers 140 associated with provider computing devices 150, in accordance with an embodiment of the present techniques. As can be seen in FIG. 2, the environment 200 may have multiple available provider computing devices 150A-150H in the area surrounding the requestor computing device 120 and the request location 123. However, the requestor may not be available immediately at the request location 123. For example, as shown by the navigation route 125, the requestor may be located in a building 122 with multiple levels and may have to travel to a particular request location where the requestor is going to be picked up. As such, the requestor may not arrive at the request location 123 for some period of time (e.g., 10 minutes). However, there are multiple provider computing devices traveling throughout the area and it can be difficult for the matching system to identify which provider to match with the request. For example, provider computing device 150A has already passed a turn to get to the request location 123 and although the provider computing device is closest to the request location 123, it may take the provider computing device 150A longer to get to the location than the proximity to the request location 123 may indicate. Further, the provider computing device 150B may arrive far too early if matched with the request. If matched, the provider computing device 150B may be forced to find parking, create a safety hazard by stopping in the middle of the street, and/or circle the block while the provider waits for the requestor 120 to arrive.

Additionally, there are multiple other provider computing devices 150C-150H in the area that may or may not be good matches for the request. However, it may be difficult for the ride matching system to identify the best match due to the uncertainty regarding where the provider may be located when the requestor is available at the request location 123. Accordingly, proximity to the request location 123 alone cannot be used to identify matches for the request as it may lead to long inefficient wait times by providers and/or not incorporate other requests, system load, system bandwidth, and system efficiency into the matching process.

Similarly, in some embodiments, the requestor may also want to request a ride for a specific time (e.g., scheduled for 10 minutes delay, etc.) and may not be ready to step out of the building until that time. As such, the requestor may enter that pickup time in the requestor application and the arrival time may be indicated as the scheduled time for pickup. Accordingly, even for request locations in close proximity to the requestor computing device, a delay may be determined for a request such that the closest provider is not a good match for a request.

Figure 3:
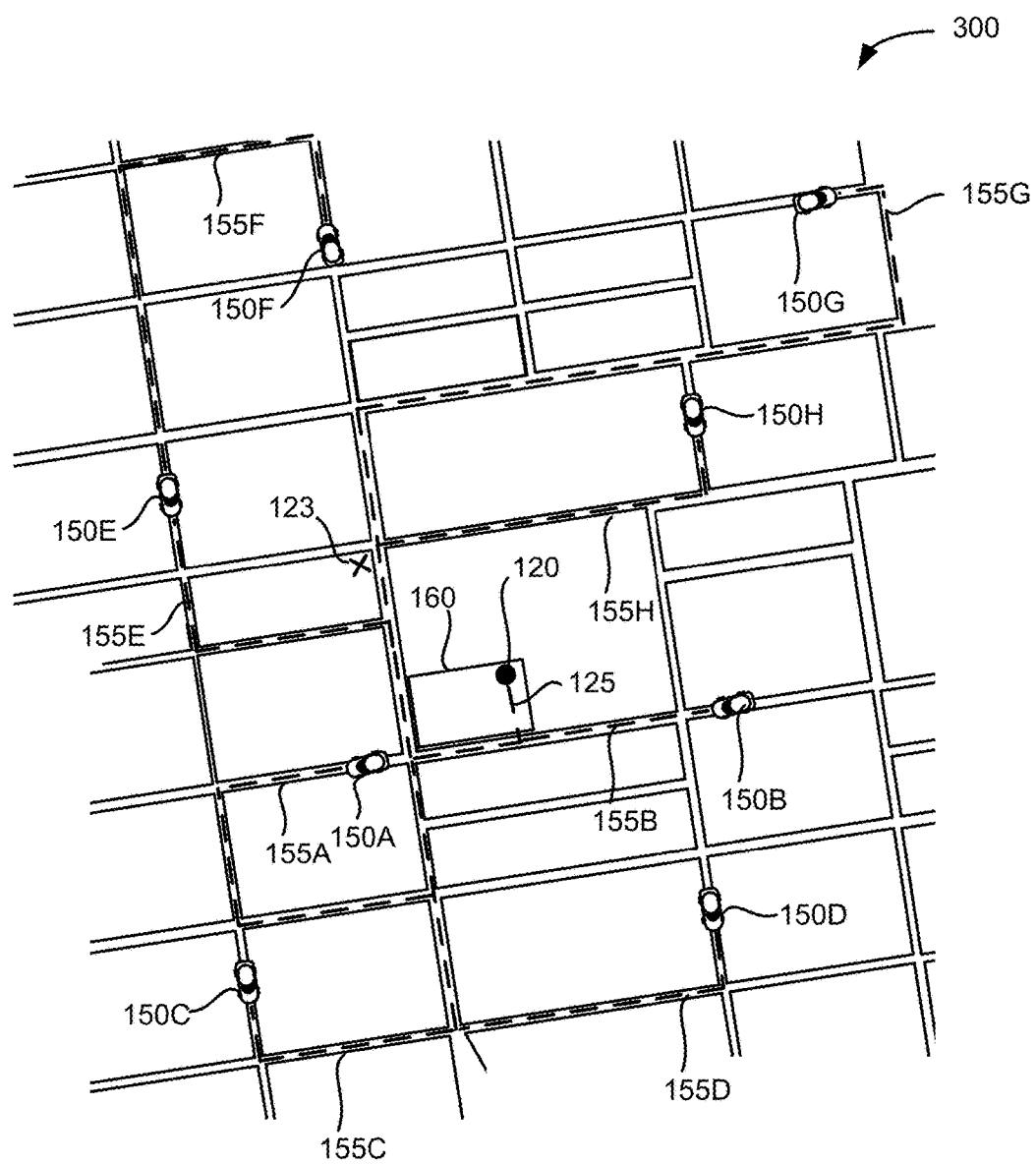
FIG. 3 illustrates an example of a ride matching system environment where a request is matched to providers according to estimated arrival times to a request location, in accordance with an embodiment of the present techniques.

FIG. 3 illustrates an example of a ride matching system environment 300 where a request is matched to providers 140A-140H through provider computing devices 150A-150H according to estimated arrival times to a request location 123, in accordance with an embodiment of the present techniques. As can be seen in FIG. 3, the ride matching system can determine navigation routes 155A-155H for each of the provider computing devices 150A-150H to travel to the request location 123 and estimate travel times for each of the navigation routes to determine eligible providers for the request. Accordingly, the ride matching system may determine an estimated arrival time for each of the providers and use the estimated arrival time to select and/or better match requestor arrival times with provider travel times. Each of the navigation routes 155A-155H for each of the provider computing devices 150A-150H may have a calculated estimated travel time to the request location 123 that may range from very short (e.g., 1 minute) to long (e.g., 30 minutes). The provider computing devices 150A-150H may only include those providers that are "available" meaning that they have at least one seat open to be potential matches with the request. Further, in some embodiments, the request may have further criteria that limit the number of available providers for the request. For example, car seats, pet friendly, and/or particular sizes or types of vehicles may be used to limit the number of "available" providers for the request. Additionally, the estimated travel times may incorporate traffic, weather conditions, mode of transportation, and/or any other conditions that may affect the speed in which a provider may arrive at the request location 123.

Figure 4A:
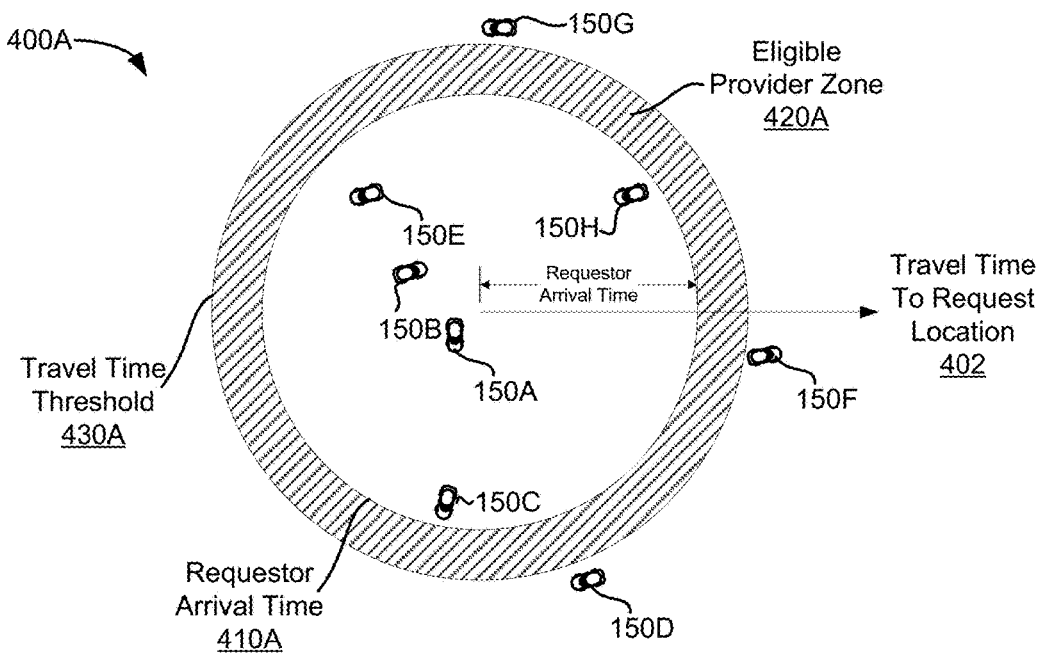
FIGS. 4A-4B illustrate example dynamic models based on travel time for a requestor and providers to a request location, in accordance with an embodiment of the present techniques.
Figure 4B:
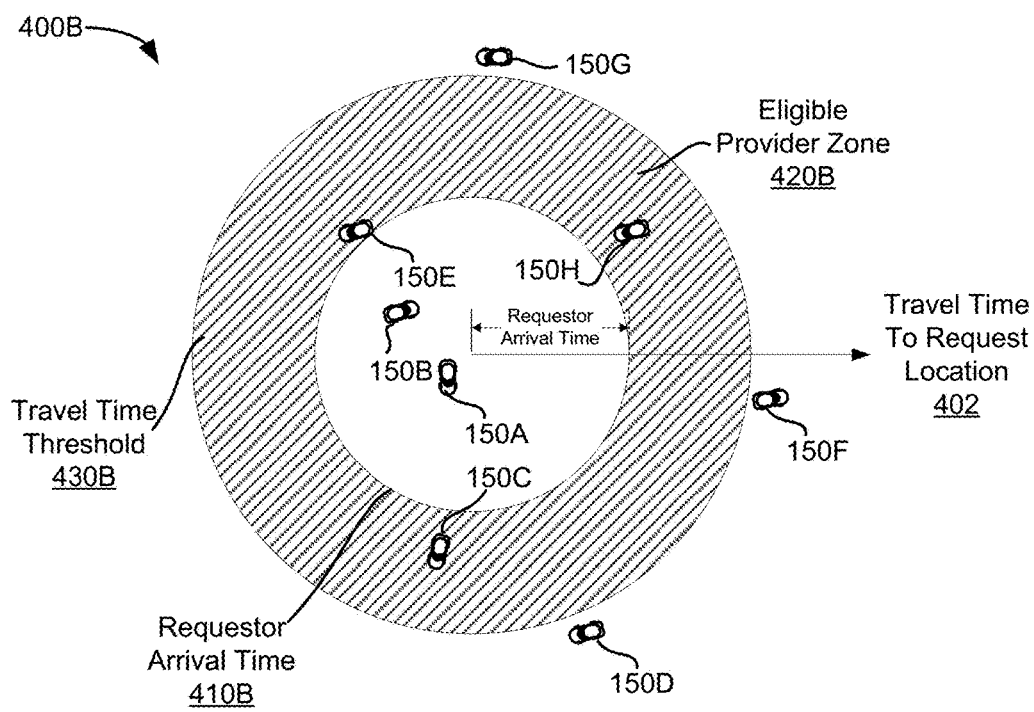

FIGS. 4A-4B illustrate example dynamic models based on travel times for a requestor computing device 120 and provider computing devices 150 to a request location 123, in accordance with an embodiment of the present techniques. FIG. 4A shows a dynamic provider eligibility model 400A that maps provider travel times for the available providers 150A-150H related to the request of FIGS. 2-3. The dynamic provider eligibility model 400A is defined by a torus/donut shape where the radius of the internal circle of the model is determined by an estimated arrival time for the requestor to arrive at the request location 410A. Any providers within the inner circle of the donut may not be eligible for the passenger request. The radius of the outer circle of the donut shape may be determined by a travel time threshold 430A (e.g., maximum distance and/or travel time) from the request location. An eligible provider zone 420A may be defined by the inner and outer circles to include only providers that have estimated travel times that are greater than the request arrival time but less than the travel time threshold.

However, as can be seen in FIG. 4A, there may not be any eligible providers within the eligible provider zone upon the receiving of the request. Accordingly, the ride matching system may monitor the status of the requestor and update the radius of the requestor arrival time over time as the requestor gets closer to being available. As such, the model is dynamic such that as the requestor moves closer to the request location and/or as the scheduled request time approaches, the diameter of the inner circle becomes smaller, leading to more eligible providers for matching. For example, as shown in FIG. 4B, the requestor arrival time as changed to a smaller amount of time such that the eligible provider zone 420B is much larger than the eligible provider zone 420A of FIG. 4A. As can be seen in FIG. 4B, the same providers that were previously not eligible to be matched in FIG. 4A, are now eligible due to the shrinking of the requestor arrival time. Accordingly, provider computing devices 150C, 150E, and 150H are all eligible for matching with the request. The ride matching system may then determine which of the eligible available providers to match with based on other factors such as, existing route being traveled by the provider, provider rating, earliest arrival time, latest arrival time, and/or any other relevant information.

Moreover, in some embodiments, the ride matching system may delay matching with an eligible provider where the requestor arrival time is long enough that better matching providers may become available before the requestor arrives at the request location. For example, in some embodiments, the ride matching system may determine a predicted available provider estimate for the request location and use the predicted available provider estimate to determine whether a match should be made now or to delay matching. For instance, some areas may have a large number of providers dropping off requestors regularly which will provide additional available providers within an eligible provider zone of the dynamic model over time. As such, the ride matching system may obtain a predicted available provider estimation based on current ride progress to the surrounding areas within the eligible provider zone of the dynamic model as well as a rate of new providers logging on in the area. Accordingly, embodiments may allow the ride matching system to predict other potential providers that may become available before the requestor arrival time is met and thus, allow for other providers to become available before matching with the first possible eligible provider. Accordingly, in some embodiments, ride request matching may be held to maximize system efficiency by minimizing drive distance and travel time for providers as more providers become eligible as the passenger travels closer to the request location.

Further, although not shown in FIG. 4B, the provider computing devices 150A-150H may move position and thus, their corresponding travel times may change between the determination of the first eligibility model 400A and the second eligibility model 400B. Accordingly, those providers that are outside the travel time threshold in the first eligibility model 400A but that are traveling toward the request location 123 may move into the provider eligibility zone for the second eligibility model 400B. Similarly, those providers that are within the provider eligibility zone 420A in the first eligibility model 400A may move out of the provider eligibility zone 420B of the second eligibility model 400B. Thus, the ride matching system may track and monitor the travel times of the available providers over time and match the providers that are within the provider eligibility zone 420B when the efficiency of the system determines that such a match is appropriate. Travel times changes and direction of travel of the various providers may be analyzed and incorporated into the predicted available provider estimation as well.

Figure 5:
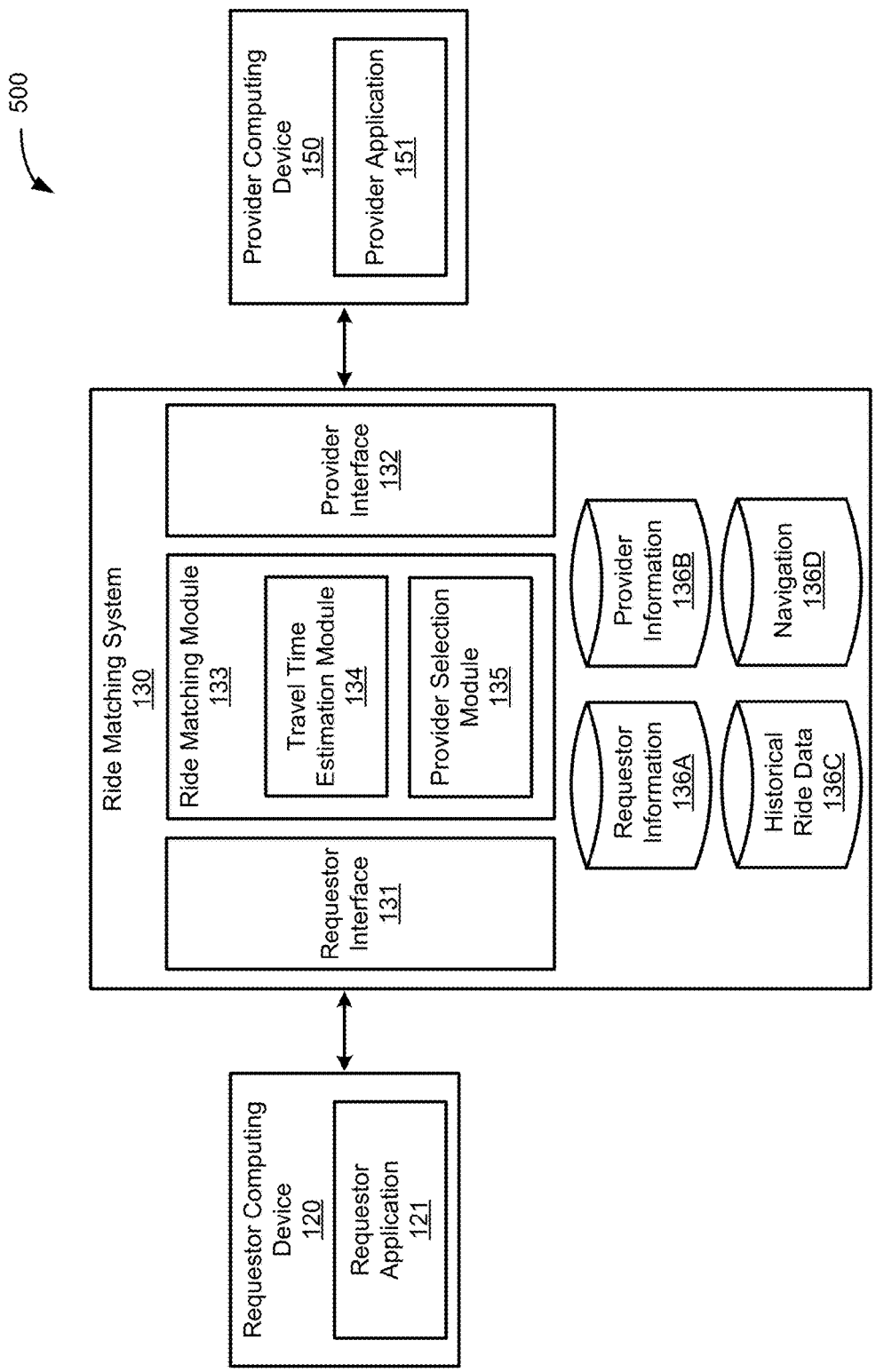
FIG. 5 illustrates an example block diagram of a ride matching system, in accordance with an embodiment of the present techniques.

FIG. 5 illustrates an example block diagram 500 of a ride matching system 130, in accordance with an embodiment of the present techniques. As described above, the ride matching system 130 may identify and facilitate request matching from requestors 110 associated with requestor computing devices 120 with available providers 140 associated with provider computing devices 150. The ride matching system 130 may include a requestor interface 131, a provider interface 132, and a ride matching module 133 including a travel tie estimation module 134, and a provider selection module 135. The ride matching system 130 may also include a requestor information data store 136A, a provider information data store 136B, a historical ride data store 136C, and a navigation data store 136D which may be used by any of the modules of the ride matching system 130 to obtain information in order to perform the functionality of the corresponding module. The ride matching system 130 may be configured to communicate with a plurality of requestor computing devices 120 and a plurality of provider computing devices 150. Although the ride matching system 130 is shown in a single system, the ride matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar request and matching functionality. Accordingly, embodiments are not limited to the matching of ride requests and one of ordinary skill would recognize that embodiments could be implemented for any number of different services that have requestors and providers being matched through a network of connected computing devices.

The requestor interface 131 may include any software and/or hardware components configured to send and receive communications and/or other information between the ride matching system 130 and a plurality of requestor computing devices 120. The requestor interface 131 may be configured to facilitate communication between the ride matching system 130 and the requestor application 121 operating on each of a plurality of requestor computing devices 120. The requestor interface 131 may be configured to periodically receive ride requests, location information, a request location (also referred to as a "pick-up" location), requestor status information, a location of the requestor computing device, progress toward a request location by the requestor computing device, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a historical ride data store 136C with the ride request information.

Additionally, the requestor interface 131 may be configured to send ride match messages, location information for the provider computing device, provider information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor computing device location, and/or any other relevant information.

A requestor computing device 120 may include any device that is configured to communicate with a ride matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the ride matching system 130 and interface with the user (i.e., requestor) of the requestor computing device 120. The requestor application 121 may allow a user to request a ride, monitor the status of a matched ride, pay for a ride, monitor past rides, perform any other requestor-oriented services related to the ride matching system 130, and/or obtain any other requestor-oriented information from the ride matching system 130.

The provider interface 132 may include any software and/or hardware configured to send and receive communications and/or other information between the ride matching system 130 and a plurality of provider computing devices 150. The provider interface 132 may be configured to periodically receive location information of the provider computing device 150, provider status information, and/or any other relevant information from the provider computing device 150 when the provider application 151 is active on the provider computing device 150. Additionally, the provider interface 132 may be configured to send ride requests, location information of a requestor computing device 120, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, a status of the provider, a provider computing device location, and/or any other relevant information.

A provider computing device 150 may include any computing device that is configured to communicate with a ride matching system 130 and/or provider computing device 150 over one or more communication networks 170. The provider computing device 150 may comprise a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the ride matching system 130 and interface with the user of the provider computing device 150. The provider application 151 may allow a user to accept a ride request, monitor the status of a matched ride, obtain or generate navigation directions or a mapped route for a matched ride, get paid for a ride, monitor past rides, perform any other provider-oriented services related to the ride matching system 130, and/or obtain any other provider-oriented information from the ride matching system 130.

The ride matching module 133 may include a software module that is configured to process ride requests, ride responses, and other communications between requestors and providers of the ride matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region.

The ride matching module 133 may include a travel time estimation module 134 and a provider selection module 135 that are configured to allow the ride matching module to perform efficient matching using the dynamic model described herein. For example, when the ride matching module 133 receives the request, the ride matching module may pass the request information including the request location, the request time, the requestor identifier, the location of the requestor, and/or any other relevant information to the travel time estimation module 134. The travel time estimation module 134 may identify available providers in the geographic area around the request location. The travel time estimation module 134 may use a threshold distance (e.g., 10 miles, 15 miles, etc.), one or more zip codes or other geographic identifiers (e.g., streets, blocks, neighborhoods, city, region, etc.), or any other suitable geographic limitation to identify available providers relevant to a request location. For example, the travel time estimation module 134 may search the provider information data store 136B to identify any available providers that are located within a certain distance from the request location. The travel time estimation module 134 may also limit the search for available providers to those that meet ride request criteria such that the available provider can serve the request. For example, whether a provider vehicle is a sedan, luxury, SUV, or other type of car, has a particular type of feature or amenity (e.g., car seat, dog friendly, etc.), has a number of available seats (e.g., request for 2 people, etc.), and/or may use any other stored information at the ride matching system to limit available providers to those that can serve the request.

Once the travel time estimation module 134 identifies the available providers in the area, the travel time estimation module 134 may calculate an estimated travel time for each of the providers from their current location to the request location. As discussed above, the travel time estimation module 134 may incorporate traffic, weather, road closures, and/or any other conditions that may affect travel time into the estimation. The travel time estimation module 134 may use historical ride data that is relevant for the time of day, streets and geographic region, as well as stored previous rides over those times, areas, road conditions, and/or any other information to obtain an estimate for the provider to travel from their current location to the request location. For example, the travel time estimation module 134 may be configured to obtain the location of each of the provider computing devices. The travel time estimation module 134 may be configured to identify the request location and map navigation routes for each of the providers and travel time estimates for the requestor to the request location. The travel time estimation module 134 may calculate an estimated time of arrival for a variety of different routes based on navigation information obtained from a navigation data store 136D. The navigation information may include real-time and historical traffic information, historical travel time information, known routes for a geographic area or region, traffic rules, and/or any other suitable information for mapping and/or identifying potential routes for traveling from one location to another based on a type of transportation (e.g., driving, biking, sailing, flying, etc.).

The travel time estimation module 134 may map a plurality of possible routes from the provider location to the request location and generate an estimated arrival time for each of the potential mapped routes. The travel time estimation module 134 may select the fastest route and/or the most probable route for each of the providers and the corresponding estimated travel time for that route as the estimated travel time for the provider. The travel time estimation module 134 may incorporate current traffic conditions, road closures, weather conditions, and any other relevant travel time related information to calculate an estimated arrival time for the provider. The estimated arrival time may also be calculated by taking an average of the arrival time of each of the mapped routes, selecting the estimated arrival time for the fastest route, receiving a selection of one of the potential routes by the provider, identifying the route being taken based on the route being used by the provider, and/or through any other suitable method. If the provider makes a wrong turn and/or follows a different route than that calculated by the travel time estimation module 134, the travel time estimation module 134 may obtain the updated location of the provider computing device and recalculate the possible routes and estimated arrival times. As such, the estimated travel times may be updated as travel and road conditions, weather, etc. are updated. Accordingly, the travel time estimation module 134 may determine a navigation route associated with the request location and an estimated travel time for each of the providers. Further, the estimated time may be determined through any suitable method including taking an average of multiple routes, selecting the fastest route, adding additional cushion time when certainty is low for the estimate of the time, etc. Accordingly, the travel time estimation module 134 may determine an estimated travel time for each of the available providers in the area that may potentially match the request.

Additionally, the travel time estimation module 134 may determine an arrival time for the requestor. The arrival time for the requestor may be dependent on a travel time as well as a request time that may have been provided in the request. For example, the travel time may be determined by determining an estimated travel time from the current location of the requestor to the request location. The travel time may be estimated by searching the requestor information data store 136A for previous time estimates associated with the route and/or the historical ride data store 136C for relevant travel times associated with the route. The requestor travel time may be determined based on walking speed and may use the navigation data store 136D to identify the travel time associated with walking from different locations. Additionally, where the requestor is located in a building, the travel time estimate may incorporate average travel times for requestors in those buildings to leave the building in order to improve the accuracy of the time estimate. Additionally, the requestor arrival time may have a request time component that is dictated by a delay input by the user into the application upon requesting the ride. For example, the requestor may need another 10 minutes before they are ready to leave but may request the ride so that they know they will be matched with a provider upon being ready to leave. Accordingly, the requestor may request that the ride be scheduled for 10 minutes, an hour, a day, or any other relevant time in the future. Accordingly, the arrival time may have both a travel time and a request time component.

In some embodiments, the travel time and the request time may be added together or may be used separately. For example, if the request is for 10 minutes away and is for a location near the user the requestor arrival time may just be the 10 minute wait. However, if the user asks for a scheduled ride at a request location that is down the block and the system determines that the user is not walking toward the request location when they should have already left, the travel time can be added to the request time as well to ensure an accurate match.

Additionally, in some embodiments, the travel time estimation module 134 may obtain all the travel estimates for the providers and the requestor by requesting estimates from a third party mapping service. For example, the travel time estimation module 134 may call an API associated with the third party mapping service such that a request location, current location of the requestor, current locations of the providers, and the request time are provided to the third party mapping service. The mapping service may perform the actual estimation of the routes and return the estimates to the travel time estimation module 134 for use in selecting a provider for the match. Either way, the travel time estimation module 134 may return the travel time estimates for the available providers and the requestor to the ride matching module 133 for further match processing.

The ride matching module 133 may then provide the estimated travel times for the providers and the requestor to the provider selection module 135. The provider selection module 135 may obtain the estimated travel times and may select one or more providers that should be matched with the request. For example, the provider selection module 135 may apply the estimated travel time of the providers and the estimated arrival time of the requestor to generate a dynamic provider eligibility model as described in reference to FIGS. 4A and 4B above. Accordingly, the provider selection module 135 may generate a dynamic provider eligibility model that incorporates both the estimated requestor arrival time and the estimated provider times of each of the providers to identify those available providers that are eligible for a match. Thus, as described above, the provider selection module 135 may identify those provider travel times that are more than the requestor arrival time but less than a threshold travel time in order to identify eligible available providers to match to the request. The provider selection module 135 may then select a subset of the eligible available providers and select one of the providers based on system efficiency, rankings, route, arrival time, and/or any other suitable information that can be used for matching. For example, two available providers may be identified as eligible for a request where one of the providers is traveling away from the request location while the other is traveling toward the request location. The provider selection module 135 may select the provider that is traveling toward the request location because it causes less driving, fewer turns, safer driving, and all the other benefits of allowing providers to maintain their current direction of travel.

Additionally, in some embodiments, the provider selection module 135 may perform available provider prediction to ensure that the best possible match is being made. For instance, the provider selection module 135 may obtain an available provider rate associated with the request location from a historical ride data store 136C that may indicate the historical rate of available providers coming online near the request location. For example, some areas may have a high rate of providers coming online during particular times that the ride matching system may use to predict available providers near the request location. For requests that have relatively large requestor arrival times outstanding (e.g., 5+ minutes) and a high rate of predicted available providers, the system may delay matching to an eligible provider even if there are multiple providers that are available and eligible for a request in order to ensure that the a more efficient system match does not arise. Additionally, the ride history data store 136C may be consulted for existing rides that have providers that will be dropping off requestors in the area before the requestor arrival time is up. For instance, if a request is received for a busy area where a number of different providers with requestors are dropping off previously matched requestors and/or where new providers are known to become active during the time frame of the requestor arrival time, the provider selection module 135 may delay matching to see if a provider becomes available in the area that is closer than the existing eligible providers for the request. The ride matching module may repeat the process and monitor the status of the available and matched providers in the area along with the progress of the requestor toward the request location to ensure that a well-matched and eligible provider is matched to the request before the requestor arrives at the request location. Accordingly, by tracking and monitoring system activity as well as using estimated arrival times for the providers and requestor over time, the system can more efficiently and effectively match provider resources with requestor resources to ensure the most efficient matching of resources.

The ride matching module 133 may provide the ride request to the provider interface 132 with the provider contact information or provider identifier so that the ride request may be sent to one or more available providers. The ride matching module 133 may send the ride request and/or the information from the ride request to one or more of the selected available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the ride matching system 130 indicating whether a ride was accepted and including a provider identifier, a location of the provider, and/or any other suitable information to allow the ride matching system 130 to process the response. Alternatively, the provider may ignore the request and after a predetermined period of time, the request may be considered denied and a corresponding ride response message may be sent to the ride matching system 130. In some embodiments, no response may be sent unless a ride request is accepted and the ride will be assumed to be denied unless a response is received from the provider. In other embodiments, no response is necessary and the ride may be immediately accepted. An indicator, flag, and/or other information may be passed back to the ride matching system to assure the system that the provider computing device received the request.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider computing device, the current location of the requestor computing device, an estimated time of arrival for the provider, and/or any other suitable information to allow the requestor and the provider to complete the requested service. The ride matching module 133 may update the historical ride data store 136C with the corresponding matched ride information for the matched ride. Accordingly, the ride matching module may perform more efficient and effective matching of requests with providers.

Figure 6:
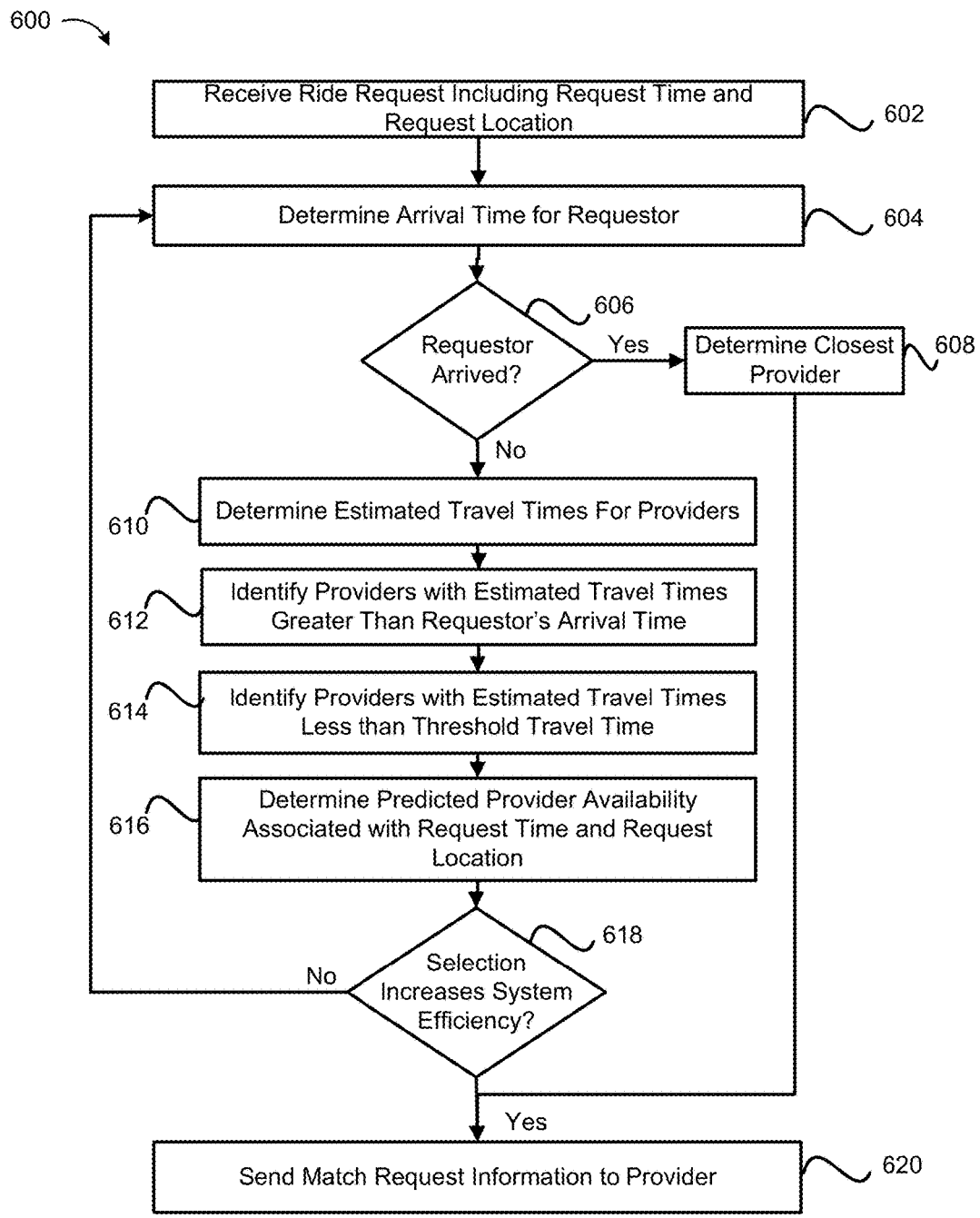
FIG. 6 illustrates an exemplary flow diagram of a method for matching a request with a provider based on a dynamic model, in accordance with embodiments of the present techniques.

FIG. 6 illustrates an exemplary flow diagram 600 of a method for matching requests using dynamic provider eligibility models, in accordance with embodiments of the present techniques. At step 602, the ride matching system receives a ride request from a requestor computing device. The ride request may include a request location (i.e., pick-up location) for the ride request, a request time, a requestor identifier, a requestor computing device location, and/or any other relevant information associated with the ride request and/or requestor.

At step 604, the ride matching system determines a requestor arrival time for the request. As described above, the requestor arrival time may be determined based on a combination of the request location and the request time provided in the request. The current location of the requestor computing device may also be used to determine a travel time to the request location. Accordingly, the ride matching system may determine an arrival time for the requestor to the request location.

At step 606, the ride matching system determines whether the requestor computing device has arrived at the request location and/or if the request time has been met such that an immediate match should be made to the closest provider computing device to the requestor. For example, in some embodiments, the request may have an immediate request time and the requestor may already be located at or near the request location and the system may immediately match the closest provider.

At step 608, the ride matching system determines that the requestor is present at the request location and is available and thus, determines the closest provider to match with the request. The best provider match may be made using any suitable criteria including rating, existing travel route, and/or any other suitable information.

At step 610, the ride matching system determines that the requestor has not arrived at the request location and/or that the requestor arrival time is large enough such that the requestor is not available. Accordingly, the ride matching system may determine estimated travel times for providers within a geographic region proximate to the request location. As described above, the estimated travel times may be determined through any suitable process including mapping all possible routes to the request location and selecting the route with the fastest route to the request location, taking an average of the times of multiple routes, and/or through any other suitable method. Additionally, a third party mapping service may be used to identify estimated travel times for each of the available providers near the request location.

At step 612, the ride matching system may use the estimated travel times to generate a dynamic model of travel times for matching the providers by first identifying providers with estimated travel times that are greater than the requestor arrival time. Accordingly, any providers that may arrive before the requestor's arrival time are not eligible for matching.

At step 614, the ride matching system may further build the dynamic model by identifying a subset of the available providers from step 612 that have estimated travel times that are lower than a threshold travel time for the request location. The threshold travel time may be preset for the request location, the region of the request, based on providers, based on the requestor, and/or through any other suitable manner. Additionally, note that the order of steps 612 and 614 may be switched such that the threshold travel time limitation is applied before the requestor arrival time limitation is applied.

At step 616, the ride matching system may determine a predicted provider availability for the request location and the request time in order to predict the number of available providers that may become available in the area. For example, the ride matching system may identify those providers with drop-offs near the request location that may occur before the requestor arrival time and may use these potentially available providers to forecast and/or predict additional available providers that may become available before a match is necessary. Further, provider activation rates in the area and the present supply of potential providers may all be factored into the predication to determine whether to match an eligible provider with the request or to wait for other closer providers to become available before the requestor arrives. Accordingly, the ride matching system may delay in matching an eligible provider with the request to ensure the most efficient match possible.

At step 618, the ride matching system may determine whether matching the request with one or more eligible providers increases the system efficiency or if the ride matching system should wait for the requestor arrival time to decrease, thus making more eligible provider matches available. The ride matching system may also wait for additional eligible providers to become available due to drop-offs from pre-existing matched rides or movement into the eligibility zone of the dynamic eligibility model. Accordingly, the ride matching system may determine the predicted provider availability for the request based on the requestor arrival time and determine whether an eligible match should be made or if the system should wait for additional available providers to become eligible. If the ride matching system determines that matching a provider would not increase the system efficiency based on the predicated availability, the ride matching system may return to step 604 and repeat the process until a match is made.

At step 620, the ride matching system determines that the match increases the system efficiency and thus, the ride matching sends the ride request to the selected available provider computing device. The ride request may include the request location, requestor information, and/or any other relevant information to allow the provider to identify whether they want to accept or decline the ride request. The provider may review the ride request, accept the request, and send a ride response including an indicator that the provider accepts the ride request. The provider computing device may receive or generate a navigation route to the request location and may start to travel toward the request location.

Note that although the present example focuses on on-demand ride-sharing applications, any suitable service may be performed using similar functionality. For example, delivery of services may have a similar process implemented to find the location of delivery of the service.

Figure 7:
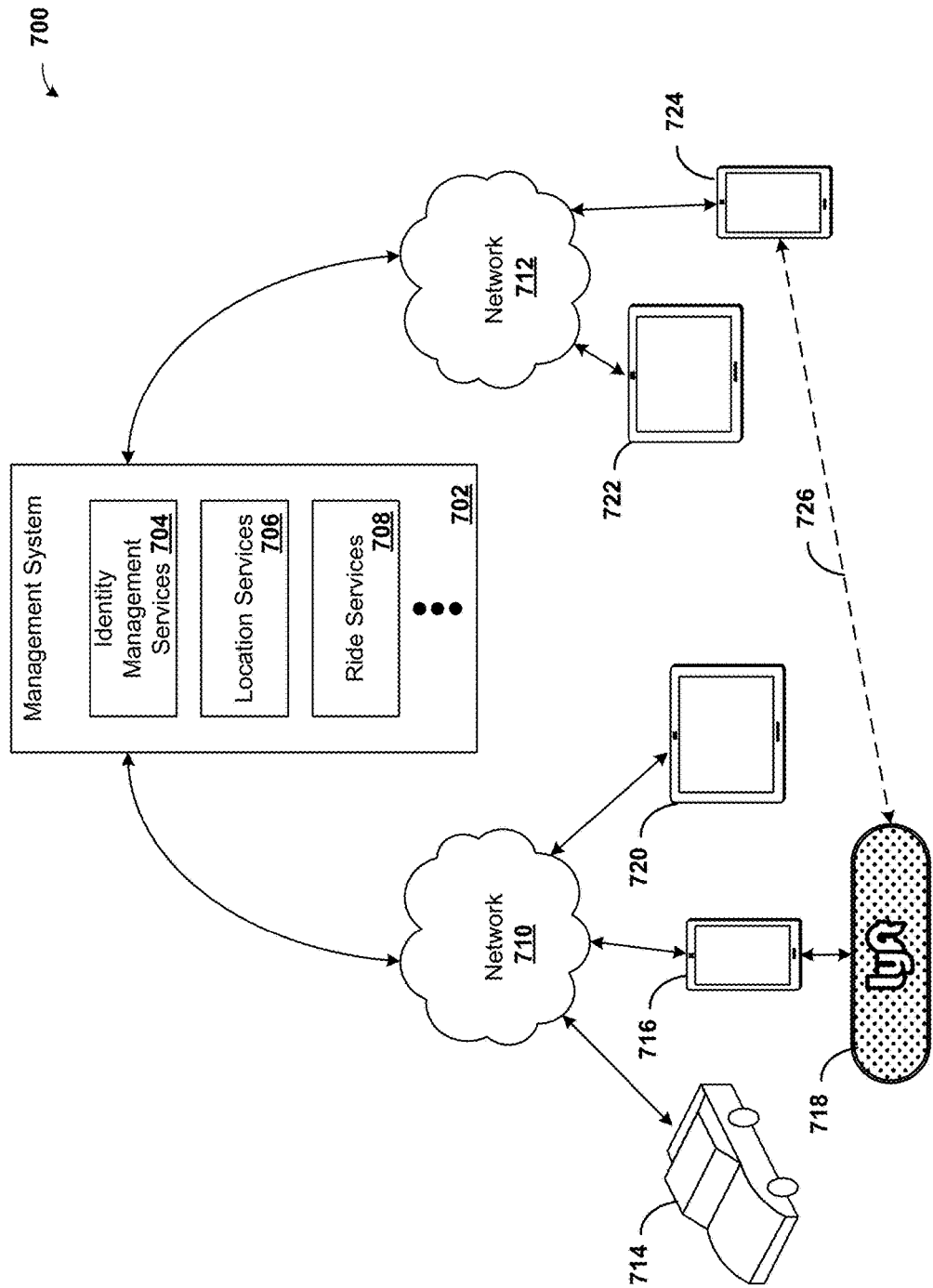
FIG. 7 illustrates an example requestor/provider management environment, in accordance with various embodiments.

FIG. 7 shows a requestor/provider management environment 700, in accordance with various embodiments. As shown in FIG. 7, a management system 702 can be configured to provide various services to requestor and provider devices. Management system 702 can run one or more services or software applications, including identity management services 704, location services 706, ride services 708, or other services. Although three services are shown as being provided by management system 702, more or fewer services may be provided in various implementations. In various embodiments, management system 702 may include one or more general purpose computers, server computers, clustered computing systems, cloud-based computing systems, or any other computing systems or arrangements of computing systems. Management system 702 may be configured to run any or all of the services and/or software applications described with respect to various embodiments of the present techniques described herein. In some embodiments, management system 702 can run any appropriate operating system as well as various server applications, such as common gateway interface (CGI) servers, JAVA® servers, hypertext transport protocol (HTTP) servers, file transfer protocol (FTP) servers, database servers, etc.

Identity management services 704 may include various identity services, such as access management and authorization services for requestors and providers when interacting with management system 702. This may include, e.g., authenticating the identity of providers and determining that the providers are authorized to provide services through management system 702. Similarly, requestors' identities may be authenticated to determine whether the requestor is authorized to receive the requested services through management system 702. Identity management services 704 may also control access to provider and requestor data maintained by management system 702, such as driving and/or ride histories, personal data, or other user data. Location services 706 may include navigation and/or traffic management services and user interfaces, or other location services.

In various embodiments, ride services 708 may include ride matching and management services to connect a requestor to a provider. Ride services 708 may include a user interface and or may receive data from requestors and providers through applications executing on their respective devices. Ride services 708 may, e.g., confirm the identity of requestors and providers using identity management services 704, and determine that each user is authorized for the requested ride service. In some embodiments, ride services 708 can identify an appropriate provider using a location obtained from a requestor and location services 706 to identify, e.g., a closest provider. As such, ride services 708 can manage the distribution and allocation of provider and requestor resources, consistent with embodiments described herein.

Management system 702 can connect to various devices through network 710 and 712. Networks 710, 712 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 710, 712 can include local area networks (LAN), such as Ethernet, Token-Ring or other LANs. Networks 710, 712 can include a wide-area network and/or the Internet. In some embodiments, networks 710, 712 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 710, 712 can include a mobile network, such as a mobile telephone network, cellular network, satellite network, or other mobile network. Networks 710, 712 may be the same as communication network 170 in FIG. 1. In some embodiments, networks 710, 712 may each include a combination of networks described herein or other networks as are known to one of ordinary skill in the art.

Users may then utilize one or more services provided by management system 702 using applications executing on provider and requestor devices. As shown in FIG. 7, provider computing devices 714, 716, 718, and/or 720 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 710, 712. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 714 can include a vehicle-integrated computing device, such as a vehicle navigation system, or other computing device integrated with the vehicle itself.

In some embodiments, provider computing device 718 can include a provider communication device configured to communicate with users, such as drivers, passengers, pedestrians, and other users. In some embodiments, provider communication device 718 can communicate directly with management system 702 or through another provider computing device, such as provider computing device 716. In some embodiments, a requestor computing device can communicate 726 directly with provider communication device 718 over a peer-to-peer connection, Bluetooth connection, NFC connection, ad hoc wireless network, or any other communication channel or connection. Although particular devices are shown as communicating with management system 702 over networks 710 and 712, in various embodiments, management system 702 can expose an interface, such as an application programming interface (API) or service provider interface (SPI) to enable various third parties which may serve as an intermediary between end users and management system 702.

Although requestor/provider management environment 700 is shown with four provider devices and two requestor devices, any number of devices may be supported. The various components shown and described herein may be implemented in hardware, firmware, software, or combinations thereof. Although one embodiment of a requestor/provider management environment is depicted in FIG. 7, this is merely one implementation and not meant to be limiting.

Figure 8:
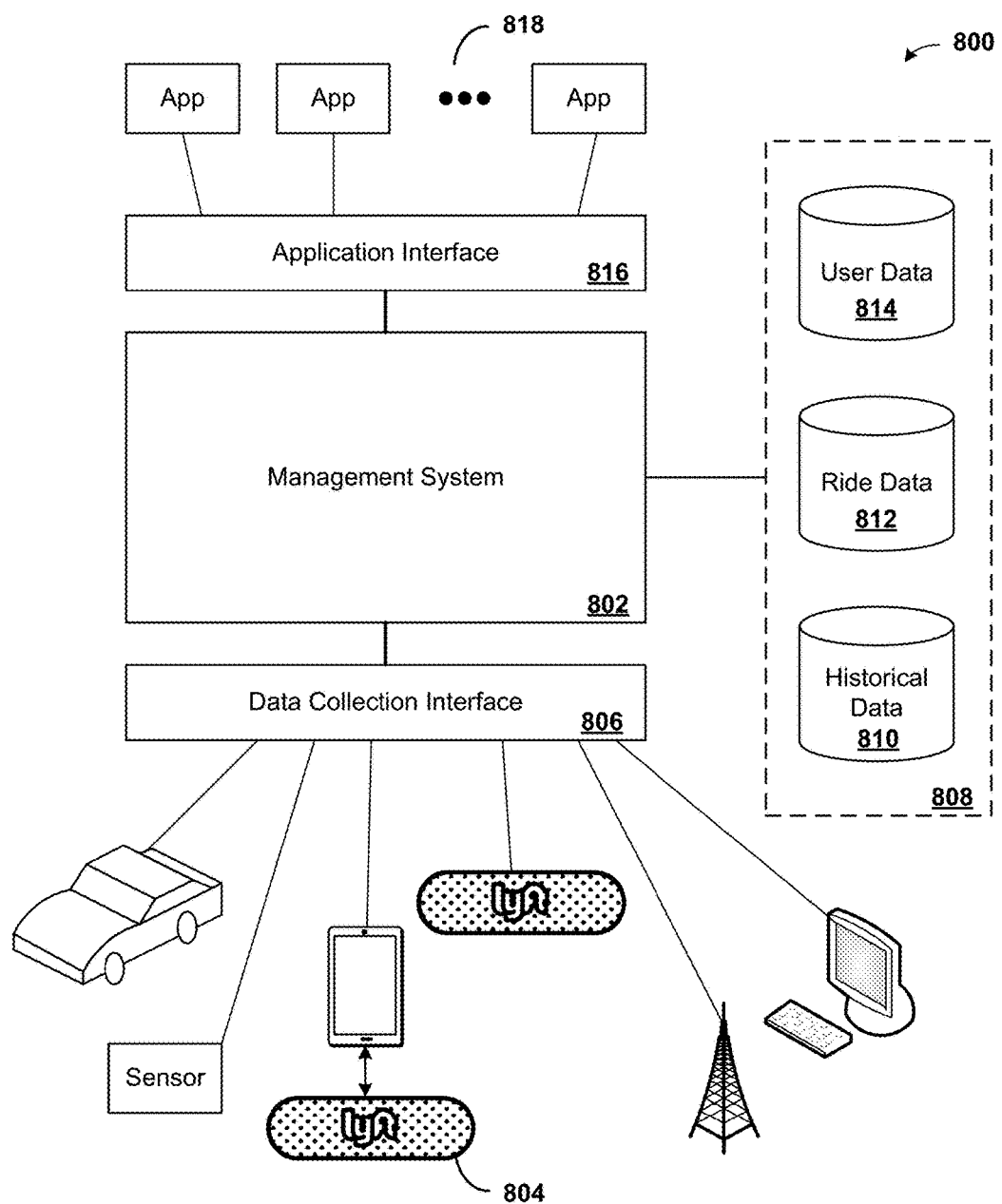
FIG. 8 illustrates an example data collection and application management system, in accordance with various embodiments.

FIG. 8 shows a data collection and application management environment 800, in accordance with various embodiments. As shown in FIG. 8, management system 802 may be configured to collect data from various data collection devices 804 through a data collection interface 806. As discussed above, management system 802 may include one or more computers and/or servers or any combination thereof. Data collection devices 804 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 806 can include, e.g., an extensible device framework configured to support interfaces for each data collection device. In various embodiments, data collection interface 806 can be extended to support new data collection devices as they are released and/or to update existing interfaces to support changes to existing data collection devices. In various embodiments, data collection devices may communicate with data collection interface 806 over one or more networks. The networks may include any network or communication protocol as would be recognized by one of ordinary skill in the art, including those networks discussed above.

As shown in FIG. 8, data received from data collection devices 804 can be stored in data store 808. Data store 808 can include one or more data stores, such as databases, object storage systems and services, cloud-based storage services, and other data stores. For example, various data stores may be implemented on a non-transitory storage medium accessible to management system 802, such as historical data store 810, ride data store 812, and user data store 814. Data stores 808 can be local to management system 802, or remote and accessible over a network, such as those networks discussed above or a storage-area network or other networked storage system. In various embodiments, historical data 810 may include historical traffic data, weather data, request data, road condition data, or any other data for a given region or regions received from various data collection devices. Ride data 812 may include route data, request data, timing data, and other ride related data, in aggregate and/or by requestor or provider. User data 814 may include user account data, preferences, location history, and other user-specific data. Although particular data stores are shown, any data collected and/or stored according to the various embodiments described herein may be stored in data stores 808.

As shown in FIG. 8, an application interface 816 can be provided by management system 802 to enable various apps 818 to access data and/or services available through management system 802. Apps 818 can run on various user devices (including provider and requestor computing devices, such as those discussed above) and/or may include cloud-based or other distributed apps configured to run across various devices (e.g., computers, servers, or combinations thereof). Apps 818 may include, e.g., aggregation and/or reporting apps which may utilize data 808 to provide various services (e.g., third-party ride request and management apps). In various embodiments, application interface 816 can include an API and/or SPI enabling third party development of apps 818. In some embodiments, application interface 816 may include a web interface, enabling web-based access to data 808 and/or services provided by management system 802. In various embodiments, apps 818 may run on devices configured to communicate with application interface 816 over one or more networks. The networks may include any network or communication protocol as would be recognized by one of ordinary skill in the art, including those networks discussed above, in accordance with an embodiment of the present disclosure.

Although a particular implementation of environment 800 is shown in FIG. 8, this is for illustration purposes only and not intended to be limited. In some embodiments, environment 800 may include fewer or more components, as would be recognized by one or ordinary skill in the art.

Figure 9C:
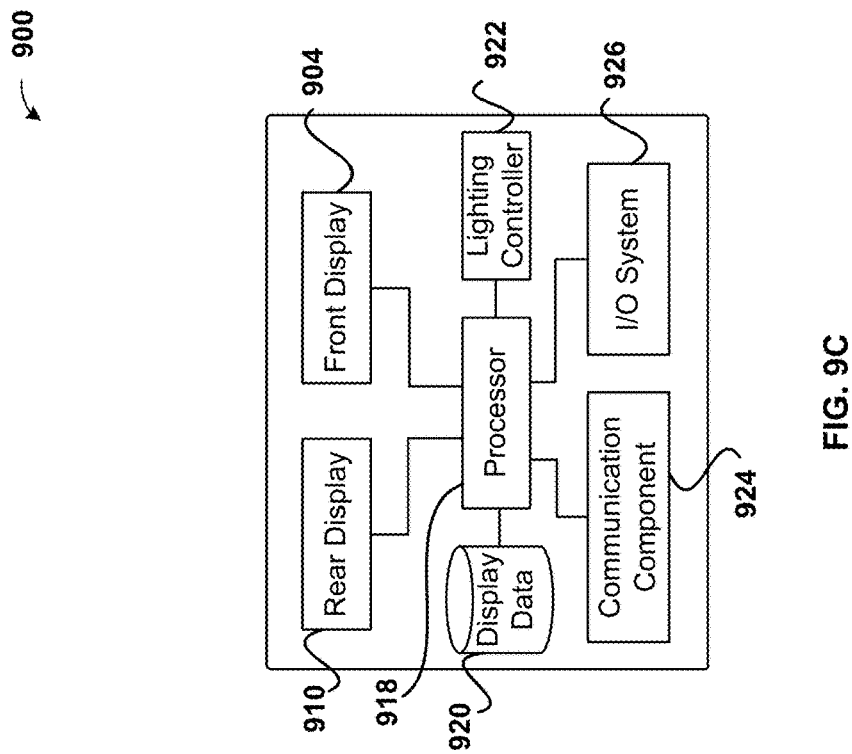
FIGS. 9A-9C illustrates an example provider communication device in accordance with various embodiments.
Figure 9A:
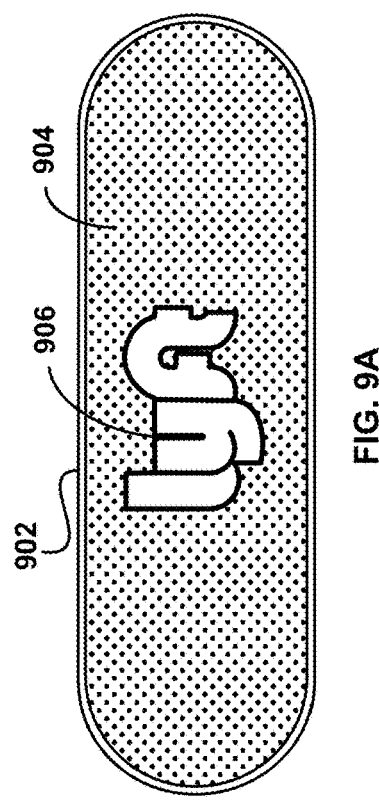
Figure 9B:
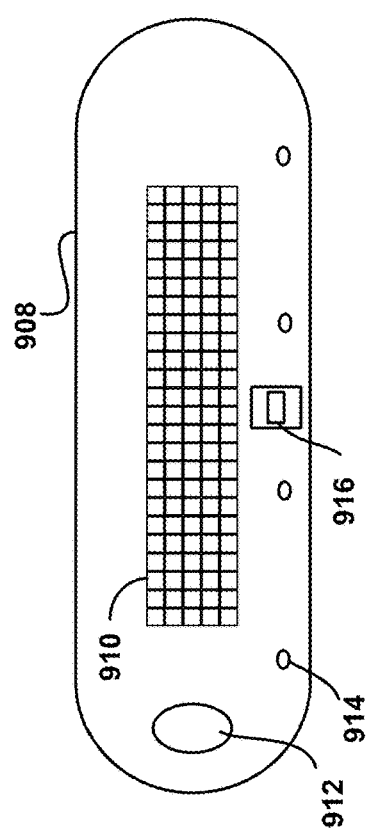

FIGS. 9A-9C show an example provider communication device 1500 in accordance with various embodiments. As shown in FIG. 9A, a front view 902 of provider communication device 900 shows a front display 904. In some embodiments, front display 904 may include a secondary region or separate display 906. As shown in FIG. 9A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 904 can be configured to show colors, patterns, color patterns, or other identifying information to requestors and other users external to a provider vehicle. In some embodiments, the secondary region or separate display 906 may be configured to display the same, or contrasting, information as front display 904.

As shown in FIG. 9B, a rear view 908 of provider communication device 900 shows a rear display 910. Rear display 910, as with front display 904, rear display 910 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 910 may be configured to provide information to users external to the provider vehicle who are located behind the provider vehicle. As further shown in FIG. 9B, provider communication device may include a power button 912 or other switch which can be used to turn on or off the provider communication device. In various embodiments, power button 912 may be a hardware button or switch that physically controls whether power is provided to provider communication device 900. Alternatively, power button 912 may be a soft button that initiates a startup/shutdown procedure managed by software and/or firmware instructions. In some embodiments, provider communication device 900 may not include a power button 912. Additionally, provider communication device may include one or more light features 914 (such as one or more LEDs or other light sources) configured to illuminate areas adjacent to the provider communication device 900. In some embodiments, provider communication device 900 can include a connector to enable a provider computing device to be connected to the provider communication device 900. In some embodiments, power may be provided to the provider communication device through connector 916.

FIG. 9C shows a block diagram of provider computing device 900. As shown in FIG. 9C, provider communication device can include a processor 918. Processor 918 can control information displayed on rear display 910 and front display 904. As noted, each display can display information to different users, depending on the positioning of the users and the provider communication device. In some embodiments, display data 920 can include stored display patterns, sequences, colors, text, or other data to be displayed on the front and/or rear display. In some embodiments, display data 920 can be a buffer, storing display data as it is received from a connected provider computing device. In some embodiments, display data 920 can include a hard disk drive, solid state drive, memory, or other storage device including information from a management system. In some embodiments, lighting controller 922 can manage the colors and/or other lighting displayed by light features 914. In some embodiments, communication component 924 can manage networking or other communication between the provider communication device 900 and one or more networking components or other computing devices. In various embodiments, communication component 924 can be configured to communicate over Wi-Fi, Bluetooth, NFC, RF, or any other wired or wireless communication network or protocol. In some embodiments, provider communication device 900 can include an input/output system 926 configured to provide output in addition to that provided through the displays and/or to receive inputs from users. For example, I/O system 926 can include an image capture device configured to recognize motion or gesture-based inputs from a user. Additionally, or alternatively, I/O system 926 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 10:
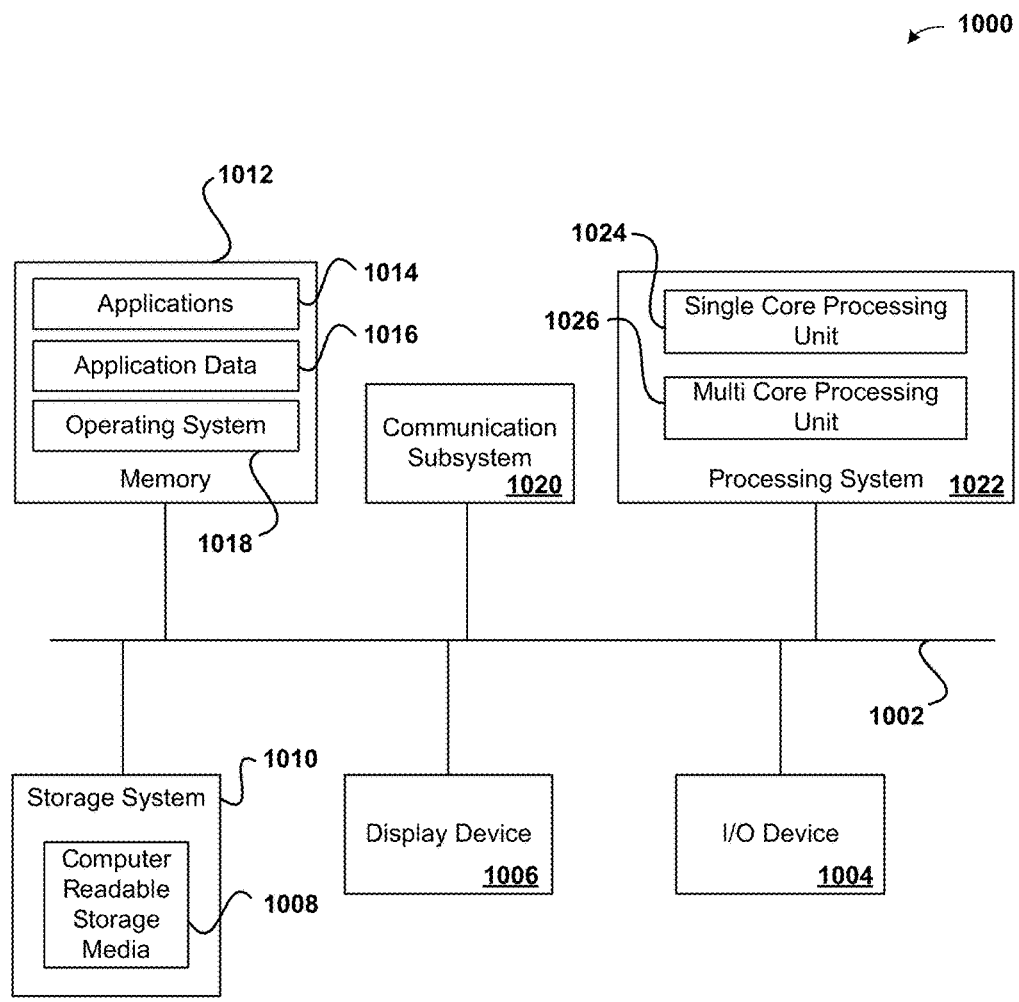
FIG. 10 illustrates an example computer system, in accordance with various embodiments.

FIG. 10 shows an example computer system 1000, in accordance with various embodiments. In various embodiments, computer system 1000 may be used to implement any of the systems, devices, or methods described herein. In some embodiments, computer system 1000 may correspond to any of the various devices described herein, including, but not limited, to mobile devices, tablet computing devices, wearable devices, personal or laptop computers, vehicle-based computing devices, or other devices or systems described herein. As shown in FIG. 10, computer system 1000 can include various subsystems connected by a bus 1002. The subsystems may include an I/O device subsystem 1004, a display device subsystem 1006, and a storage subsystem 1010 including one or more computer readable storage media 1008. The subsystems may also include a memory subsystem 1012, a communication subsystem 1020, and a processing subsystem 1022.

In system 1000, bus 1002 facilitates communication between the various subsystems. Although a single bus 1002 is shown, alternative bus configurations may also be used. Bus 1002 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1002 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1004 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1004 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1000 may include a display device subsystem 1006. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1006 may include a controller and/or interface for controlling and/or communicating with an external display, such as any of the above-mentioned display technologies.

As shown in FIG. 10, system 1000 may include storage subsystem 1010 including various computer readable storage media 1008, such as hard disk drives, solid state drives (including RAM-based and/or flash-based SSDs), or other storage devices. In various embodiments, computer readable storage media 1008 can be configured to store software, including programs, code, or other instructions, that is executable by a processor to provide functionality described herein. In some embodiments, storage system 1010 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1010 can include a media reader, card reader, or other storage interface to communicate with one or more external and/or removable storage devices. In various embodiments, computer readable storage media 1008 can include any appropriate storage medium or combination of storage media. For example, computer readable storage media 1008 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be sent and/or received.

Memory subsystem 1012 can include various types of memory, including RAM, ROM, flash memory, or other memory. Memory 1012 can include SRAM (static RAM) or DRAM (dynamic RAM). In some embodiments, memory 1012 can include a BIOS (basic input/output system) or other firmware configured to manage initialization of various components during, e.g., startup. As shown in FIG. 10, memory 1012 can include applications 1014 and application data 1010. Applications 1014 may include programs, code, or other instructions, that can be executed by a processor. Applications 1014 can include various applications such as browser clients, location management applications, ride management applications, data management applications, and any other application. Application data 1016 can include any data produced and/or consumed by applications 1014. Memory 1012 can additionally include operating system 1018, such as macOS®, Windows®, Linux®, various UNIX® or UNIX- or Linux-based operating systems, or other operating systems.

System 1000 can also include a communication subsystem 1020 configured to facilitate communication between system 1000 and various external computer systems and/or networks (such as the Internet, a local area network (LAN), a wide area network (WAN), a mobile network, or any other network). Communication subsystem 1020 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 170 in FIG. 1. Additionally, or alternatively, communication subsystem 1020 can include hardware and/or software components to communicate with satellite-based or ground-based location services, such as GPS (global positioning system). In some embodiments, communication subsystem 1020 may include, or interface with, various hardware or software sensors. The sensors may be configured to provide continuous or and/or periodic data or data streams to a computer system through communication subsystem 1020

As shown in FIG. 10, processing system 1022 can include one or more processors or other devices operable to control computing system 1000. Such processors can include single core processors 1024, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1022, such as processors 1024 and 1026, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
    at least one processor; and
    at least one non-transitory computer-readable storage medium storing instructions thereon that, when executed by the at least one processor, cause the system to:
        receive transport request information associated with a requestor computing device, the transport request information including a request location;
        determine a requestor location associated with the requestor computing device;
        determine a requestor arrival time to the request location based on a difference between the requestor location and the request location;
        determine a set of available providers based on the requestor arrival time to the request location, the set of available providers having a travel time to the request location that is greater than the requestor arrival time; and
        send the transport request information associated with the requestor computing device to a provider computing device associated with a provider from the set of available providers.

2. The system of claim 1, wherein determining the requestor arrival time to the request location based on the difference between the requestor location and the request location comprises:
    generating a navigation route from the requestor location of the requestor computing device to the request location; and
    determining an estimated travel time for the navigation route based on historical travel times associated with the navigation route, wherein the requestor arrival time to the request location is based on the estimated travel time for the navigation route.

3. The system of claim 2, wherein the transport request information includes a request time and wherein determining the requestor arrival time to the request location based on the difference between the requestor location and the request location comprises:
    determining a difference between a current time and the request time;
    determining the difference between the current time and the request time is greater than the estimated travel time for the navigation route; and
    generating the requestor arrival time based on the difference between the current time and the request time.

4. The system of claim 1, wherein determining the set of available providers based on the requestor arrival time to the request location comprises
determining that each of the set of available providers is associated with a travel time to the request location that is less than or equal to a maximum travel time threshold.

5. The system of claim 1, further comprising instructions that, when executed by the at least one processor, further cause the system to:
    determine a predicted provider availability for the request location based on the requestor arrival time to the request location;
    detect, based on the predicted provider availability, that an additional provider which is currently unavailable is predicted to become eligible for matching prior to the requestor arrival time to the request location; and
    delay a determination of the set of available providers until the additional provider becomes eligible.

6. The system of claim 1, wherein determining the set of available providers based on the requestor arrival time to the request location comprises:
    identifying a set of available provider computing devices associated with the request location, the set of available provider computing devices matching request criteria of the request, and the set of available provider computing devices being located within a threshold distance of the request location;
    determining a navigation route to the request location for each of the set of available provider computing devices; and
    generating, for each of the set of available provider computing devices, an estimated travel time based on the navigation route and road conditions of the navigation route; and
    wherein sending the transport request information to the provider computing device is based on an estimated travel time corresponding to the provider computing device associated with the provider.

7. A method comprising:
    receiving, by a dynamic transportation matching system, transport request information associated with a requestor computing device, the transport request information including a request location;
    determining, by the dynamic transportation matching system, a requestor location associated with the requestor computing device;
    determining, by the dynamic transportation matching system, a requestor arrival time to the request location based on a difference between the requestor location and the request location;
    determining, by the dynamic transportation matching system, a set of available providers based on the requestor arrival time to the request location, the set of available providers having a travel time to the request location that is greater than the requestor arrival time;
    sending, by the dynamic transportation matching system, the transport request information associated with the requestor computing device to a provider computing device associated with a provider from the set of available providers.

8. The method of claim 7, wherein determining the requestor arrival time to the request location based on the difference between the requestor location and the request location comprises:
    generating a navigation route from a current location of the requestor computing device to the request location;
    determining an estimated travel time for the navigation route based on historical travel times associated with the navigation route, wherein the requestor arrival time to the request location is based on the estimated travel time for the navigation route.

9. The method of claim 8, wherein the transport request information includes a request time and wherein determining the requestor arrival time to the request location based on the difference between the requestor location and the request location further comprises:
determining a difference between a current time and the request time;
determining the difference between the current time and the request time is greater than the estimated travel time for the navigation route; and
generating the requestor arrival time based on the difference between the current time and the request time.

10. The method of claim 7, wherein determining the set of available providers based on the requestor arrival time to the request location further comprises
determining that each of the set of available providers is associated with a travel time to the request location that is less than or equal to a maximum travel time threshold.

11. The method of claim 7, further comprising:
determining a predicted provider availability for the request location based on the requestor arrival time to the request location;
detecting, based on the predicted provider availability, that an additional provider that is currently unavailable is predicted to become eligible for matching prior to the requestor arrival time to the request location; and
delaying a determination of the set of available providers until the additional provider becomes eligible.

12. The method of claim 7, wherein determining the set of available providers based on the requestor arrival time to the request location comprises:
identifying a set of available provider computing devices associated with the request location, the set of available provider computing devices matching request criteria of the request, and the set of available provider computing devices being located within a threshold distance of the request location;
determining a navigation route to the request location for each of the set of available provider computing devices; and
generating, for each of the set of available provider computing devices, an estimated travel time based on the navigation route and road conditions of the navigation route; and
wherein sending the transport request information to the provider computing device is based on an estimated travel time corresponding to the provider computing device associated with the provider.

13. The method of claim 7, further comprising:
determining a second requestor arrival time to the request location, wherein the second requestor arrival time is less than the requestor arrival time;
determining a second set of available providers based on the second requestor arrival time; and
selecting one of the providers from the second set of available providers.

14. A non-transitory computer-readable medium comprising instructions that, when executed by at least one processor, cause a computing device to:
receive transport request information associated with a requestor computing device, the transport request information including a request location;
determine a requestor location associated with the requestor computing device;
determine a requestor arrival time to the request location based on a difference between the requestor location and the request location;
determine a set of available providers based on the requestor arrival time to the request location, the set of available providers having a travel time to the request location that is greater than the requestor arrival time; and
send the transport request information associated with the requestor computing device to a provider computing device associated with a provider from the set of available providers.

15. The non-transitory computer-readable medium of claim 14, wherein determining the requestor arrival time to the request location based on the difference between the requestor location and the request location comprises:
generating a navigation route from the requestor location of the requestor computing device to the request location; and
determining an estimated travel time for the navigation route based on historical travel times associated with the navigation route, wherein the requestor arrival time to the request location is based on the estimated travel time for the navigation route.

16. The non-transitory computer-readable medium of claim 15, wherein the transport request information includes a request time and wherein determining the requestor arrival time to the request location based on the difference between the requestor location and the request location comprises:
determining a difference between a current time and the request time;
determining the difference between the current time and the request time is greater than the estimated travel time for the navigation route; and
generating the requestor arrival time based on the difference between the current time and the request time.

17. The non-transitory computer-readable medium of claim 14, wherein determining the set of available providers based on the requestor arrival time to the request location comprises:
determining that each of the set of available providers is associated with a travel time to the request location that is less than or equal to a maximum travel time threshold.

18. The non-transitory computer-readable medium of claim 14, further comprising instructions that, when executed by the at least one processor, further cause the computing device to:
determine a predicted provider availability for the request location based on the requestor arrival time to the request location;
detect, based on the predicted provider availability, that an additional provider which is currently unavailable is predicted to become eligible for matching prior to the requestor arrival time to the request location; and
delay a determination of the set of available providers until the additional provider becomes eligible.

19. The non-transitory computer-readable medium of claim 14, wherein determining the set of available providers based on the requestor arrival time to the request location comprises:
identifying a set of available provider computing devices associated with the request location, the set of available provider computing devices matching request criteria of the request, and the set of available provider computing devices being located within a threshold distance of the request location;

determining a navigation route to the request location for each of the set of available provider computing devices; and generating an estimated travel time based on the navigation route and road conditions of the navigation route for each of the provider computing devices; and wherein sending the transport request information to the provider computing device is based on an estimated travel time corresponding to the provider computing device associated with the provider.

20. The non-transitory computer-readable medium of claim 14, further comprising instructions that, when executed by the at least one processor, further cause the computing device to:

determine a second requestor arrival time to the request location, wherein the second requestor arrival time is less than the requestor arrival time;

determine a second set of available providers based on the second requestor arrival time; and select one of the providers from the second set of available providers.

* * * * *